US010528972B2

(12) United States Patent
Zhang et al.

(10) Patent No.: US 10,528,972 B2
(45) Date of Patent: Jan. 7, 2020

(54) PREDICTING EMAIL RESPONSES

(75) Inventors: Xin Zhang, San Jose, CA (US);
Hsiu-Khuem Tang, San Jose, CA (US);
Zainab Jamal, Mountain View, CA (US); Krishna Venkatraman, Palo Alto, CA (US)

(73) Assignee: Micro Focus LLC, Santa Clara, CA (US)

( * ) Notice: Subject to any disclaimer, the term of this patent is extended or adjusted under 35 U.S.C. 154(b) by 241 days.

(21) Appl. No.: 12/548,429

(22) Filed: Aug. 27, 2009

(65) Prior Publication Data
US 2011/0055000 A1 Mar. 3, 2011

(51) Int. Cl.
*G06Q 30/02* (2012.01)
*G06N 5/00* (2006.01)
*G06N 20/00* (2019.01)

(52) U.S. Cl.
CPC ......... *G06Q 30/0244* (2013.01); *G06N 5/003* (2013.01); *G06N 20/00* (2019.01); *G06Q 30/0229* (2013.01)

(58) Field of Classification Search
CPC ......... G06Q 30/0244; G06Q 30/02229; G06N 5/003; G06N 20/00
USPC ................. 705/14.3, 14.43; 706/52; 709/206
See application file for complete search history.

(56) References Cited

U.S. PATENT DOCUMENTS 6,839,680 B1    1/2005  Liu et al.
9,202,227 B2 *  12/2015 Kahlow ............. G06Q 30/0202

2003/0101449 A1    5/2003  Bentolila et al.
2007/0288298 A1 * 12/2007  Gutierrez et al. .............. 705/10
2008/0126176 A1    5/2008  Iguchi

OTHER PUBLICATIONS

Cui et al. "Model Selection for Direct Marketing: Performance Criteria and Validation Methods" by Marketing Intelligence & Planning vol. 26, No. 3, 2008, Emerald Publishing Limited.*
Gary Saarenvirta, "Data Mining for Direct Mail: A Lesson in Predictive Modeling". Intelligence Enterpresie, Mar. 9, 1999.*
Fenstermacher et al.; "Mining Client-Side Activity for Personalization" Department of Management Information Systems, Eller College of Business and Public Administration, University of Arizona, Jun. 2002.
Shahabi et al.; "Yoda An Accurate and Scalable Web based Recommendation System?" University of Southern California, Los Angeles, Sep. 2001
Chattertrap; Online http://www.chattertrap.com; Jul. 20, 2010.
HSNW: SRI defense technology spawns civilian application: published Jun. 29, 2010.
Anthony Ha: Facebook investor backs Chattertrap, a personal assistant for content Jun. 28, 2010.
Baoyao, Zhou; "Intelligent Web Usage Mining" Nanyang Technological University, Division of Information Systems, School of Computer Engineering, 2004.

(Continued)

*Primary Examiner* — Raquel Alvarez

(57) ABSTRACT

One embodiment is a method that predicts a probability of users responding to a second email campaign based on data gathered from a first email campaign. Data from the first email campaign is applied to different models to identify attributes that are predictive of users who responded to the first email campaign. These attributes are used to predict a probability of users responding to the second email campaign.

20 Claims, 5 Drawing Sheets

500

| User ID | Campaign ID | Days Since Last Upload | Upload Sessions Last Month | Upload Sessions Last Quarter | Upload Sessons Last Year | Prob F | Campaign Offer | Responded To Campaign? |
|---|---|---|---|---|---|---|---|---|
| 101 | C001 | NA | 0 | 0 | 0 | 0.95 | "20 Free Prints" | 0 |
| 101 | C005 | NA | 0 | 0 | 0 | 0.95 | "15% Off" | 0 |
| 101 | C006 | 34.0 | 0 | 3 | 3 | 0.95 | "20 Free Prints" | 0 |
| 102 | C001 | 60.5 | 0 | 2 | 2 | 0 | "20 Free Prints" | 0 |
| 102 | C005 | 197.4 | 0 | 0 | 2 | 0 | "15% Off" | 0 |
| 102 | C006 | 312.7 | 0 | 0 | 2 | 0 | "20 Free Prints" | 0 |

(56) References Cited

OTHER PUBLICATIONS

Baynote Inc.: The Collective Intelligence Platform, Online, http://www.baynote.com/technology/platform/ Aug. 2010.
Hottolink Inc.; "Recognize" Online, http://www.hottolink.co.jp/english/reconize.html, 2009.
Andrejko et al.: User Characteristics Acquisition from Logs with Semantics 8. Slovak University of Technology in Bratislava Apr. 2007.
Hongjun Lu et al: Extending a Web Browser with Client-Side Mining, Hong Kong University of Science and Technology Department of Computer Science, Clear Water Bay, Kowloon, Hong Kong, China, 2003.
Shankar et al.; "Personalized Web Search Based on Client Side Ontology", CS 498: B.Tech Project, 10. IIT Kanpur, India 2010.
Sendhikumar et al.; "Personalized ontology for web search personalization" 1. Anna University, Chennai, India , Jan. 2008.
Why Wubat? Website User Behavior & Analysis Tool, Wubat, Online, http://www.wubat.com/, 2008.
Claypool et al.; "Implicit Interest Indicators", 14. Worcester Polytechnic Institute, Worcester, Computer Science Department Worcester Polytechnic Institute Worcester, MA 01609, USA., Jan. 2001.
Shahabi et al.; A Framework for Efficient and Anonymous Web Usage Mining Based on Client-Side Tracking, 15. University of Southern California, Los Angeles, 2002.

\* cited by examiner

PREDICTING EMAIL RESPONSES

BACKGROUND

Companies send large volumes of emails to customers in the form of email campaigns to market products and services. The emails often include advertisements, promotions, new products, and other information that inform potential customers and convince them to purchase or use a product or service.

Email campaigns are effective since they enable an advertiser to target a specific list of people, track user responses, and market products and services at a relatively low cost when compared with other marketing alternatives, such as massive postal mailings.

At the same time, email campaigns are often viewed as being spam or unsolicited bulk email since the recipient does not desire to receive the email. If a large number of recipients complain about receiving unwanted emails, then the advertiser can be blacklisted by the Internet Service Providers (ISPs) or email providers and prevented from distributing emails in the current and subsequent email campaigns. Furthermore, large email campaigns can be rather inefficient when only a tiny fraction of recipients respond to the email. An advertiser can also accumulatively spend a large sum of money to third-party email vendors for sending huge amount of emails.

DETAILED DESCRIPTION

Embodiments relate to systems, methods, and apparatus that predict a probability of an individual responding to an email.

Embodiments are used, for example, in a marketing campaign wherein a large number of emails are transmitted to a targeted group of customers. Customers are targeted and selected to receive a particular email based on a model that uses various attributes. These attributes are used to target and select customers to increase the response rate of the customers to the emails.

The marketing campaign provides an overall increased effectiveness since a larger number or percentage of customers positively responds to emails. Embodiments thus improve targeting accuracy and reduce the cost of running an email marketing campaign while achieving a higher response rate and response volume.

Embodiments predict user responses to email marketing campaigns and identify the best customers for receiving emails. As such, customers are more likely to be responsive in a positive manner since emails are tailored to their desires or needs for particular products and services being offered by the advertiser.

In one example embodiment, several attributes or factors are used to build the model and predict a likelihood that an individual or group of individuals will positively respond to an email (for example, a positive response occurs when a customer purchases a product or service advertised in the email, clicks or follows a link provided in the email, replies to the email, etc.). By way of example, these predictive attributes include customer static attributes or personal characteristics of the individual (e.g., gender of the email recipient), stimulus attributes of the email or nature of the content of the email (e.g., format of the email, prices discounts or product sales advertised in an email newsletter), and dynamic customer attributes or previous interactions between the individual and the business advertising the goods or services in the email. By way of illustration, such previous interactions include, but are not limited to, what products or services a customer previously purchased from the business, how many days ago (i.e., period of time) since a customer last visited a website of the business or bought a product or service, etc.

Example embodiments can be used in various types of marketing campaigns that transmit emails to users, such as emails being transmitted through a web service and/or web server. For illustration purposes, one example embodiment is described in connection with SNAPFISH™, which is a web-based service that provides users with photo sharing and print services. SNAPFISH™ operates a website (Snapfish.com) with tens of millions of registered users. To keep users engaged, SNAPFISH™ conducts several large-scale email campaigns per month. Generally, each campaign is sent to a large number of customers.

Figure 1:
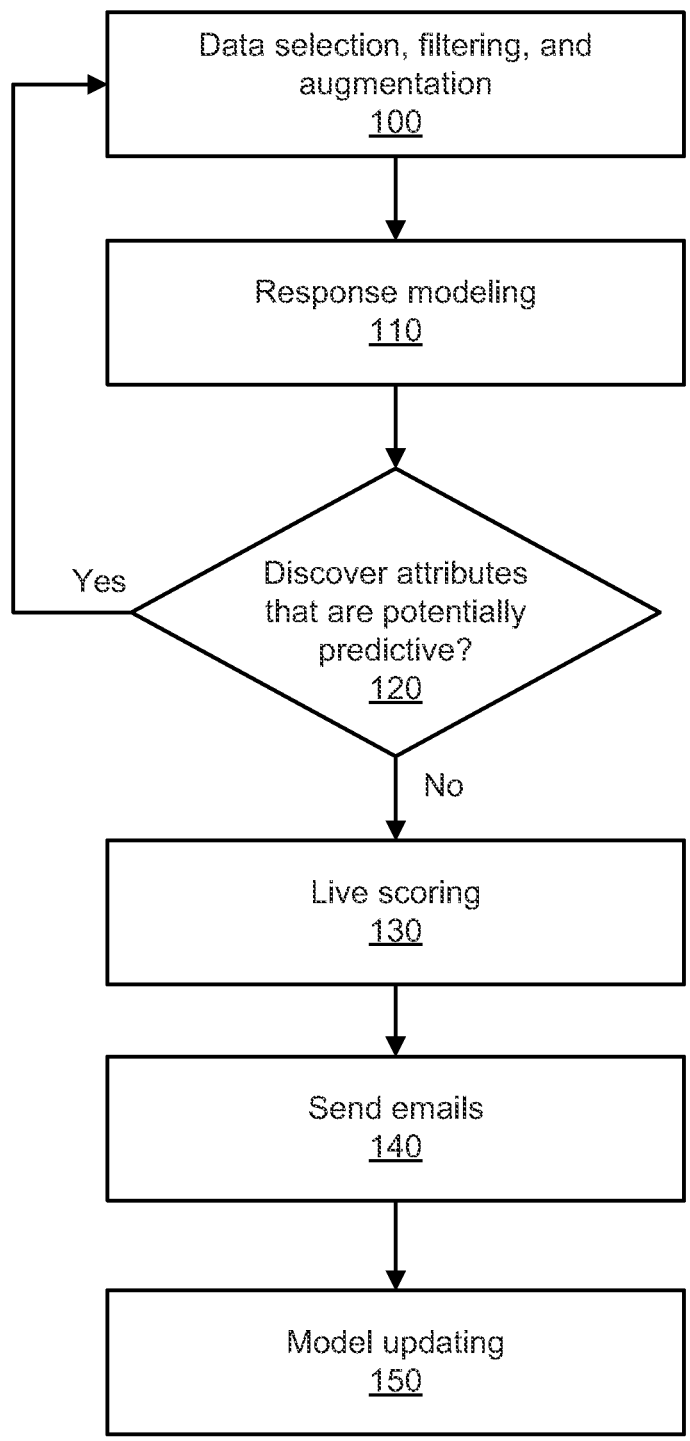
FIG. 1 shows a multi-step process for predicting user responses to an email marketing campaign in accordance with an example embodiment of the present invention.

FIG. 1 shows a multi-step process for predicting user responses to an email marketing campaign. The method described in the blocks of FIG. 1 can be implemented in hardware, software, firmware, and/or modules associated therewith.

According to block 100, data selection, filtering and augmentation occur, a set of past email campaigns relevant to a planned future email campaign is selected or obtained, such a retrieved from a database or storage. Data filtering methods are applied to a large amount of customer data (e.g., greater than 1 terabyte) that include customer transactions (such as registration, photo uploading, photo sharing, purchases of prints and other products). The filtered data is augmented with additional data sources, such as the subject lines of email messages, the format of the email, the value offered in the email (percentage discounts, dollar amount of free products, the type of product featured, etc.), the time-of-the-year or occasion of the email timing (such as Christmas shopping season, back-to-school, Valentine, Fourth-of-July, etc.), as well as a first-name-to-gender translator. The translator predicts a probability of a person being male or female given the person's first name (the user registration data includes the user's first name but not gender). For example, a name is references against a lookup table or list of names to determine a gender of the name. This information is informative since the gender of the email recipient is predictive of email response behavior.

A large matrix or table (also known as a "rectangular dataset") is generated from the data selection, filtering, and augmentation processes on the data. This matrix includes several hundred thousand data rows (each row represents a user) and numerous columns (such as 80 columns with each column being an "attribute" describing the user at various points of time). In some example embodiments, another data structure is utilized in lieu of a large matrix or table. This data structure(s) includes a tree, heap, stack, or some other suitable data structure.

According to block 110, response modeling (model learning) occurs. One example embodiment builds, generates, and/or applies a discrete-choice (logit) model and a classification-tree algorithm aucCART to the data from block 100 and predicts a probability that a user will respond to a future or subsequent email campaign. The discrete-choice model is statistical based, while the classification tree algorithm is machine-learning oriented. Both response modeling methods take input of the dozens of columns (or attributes) from the data filtering and augmentation step, and identify the most important (relevant) columns that are predictive of the response. By employing different types of response models for predicting the same response behavior, example embodiments cross-check the models and discover predictors and attribute transformations that would be overlooked and missed in a single model. During the cross-check, a comparison is made between the predictive attributes identified by each respective model. This comparison assists in determining which model or which predictive attributes are most accurate in determining or predicting which users will respond to a future email campaign. Hold-out (or out-of-sample) tests are performed on the accuracy of both methods, and the best or most accurate model is selected.

One example embodiment uses a choice-based sampling method for dealing with a low response rate. This method is more fully discussed below.

According to block 120, a determination is made as to whether attributes are discovered that are potentially predictive. If the answer to this inquiry is "yes" flow proceeds back to block 100 to the data filtering and augmentation step to extract those attributes. If the answer to this inquiry is "no" flow proceeds to block 130. Thus, these two steps may iterate back and forth many times.

The end result of the data filtering and response modeling steps is the "best" model (i.e., one that achieves the highest "lift" or the greatest "capture" on a hold-out or test dataset). The model is either a mathematical formula (from the discrete-choice model) or a decision tree (from the classification tree algorithm) that predicts the probability of email response, along with the subset of columns (attributes) and their transformations that are deemed most predictive.

According to block 130, live scoring occurs. Once the best model is selected and tested on hold-out data samples, one example embodiment applies the model to live customer data. As time goes on, a user's attributes change (new photo uploads, sharing, purchases, etc.), hence the likelihood of a user responding to an email also changes.

Although an email campaign can be planned in days (rather than in seconds as in online real-time applications), one example embodiment devises a fast method (using Structured Query Language, SQL) for speedy execution of the data selection, filtering, and augmentation. This method computes the probabilities of responses based on the best prediction model. For example, one example method is able to score 43 million users in 4.5 hours and thus makes daily updates of user scores possible.

According to block 140, once the live scoring occurs, the email campaign is initiated and emails are sent. Emails are sent to users who are likely to respond to a particular email (such as particular offers for products or services, advertisements, promotions, discounts, etc.).

According to block 150, model updating occurs. Here, the response modeling process is maintaining and updating the model itself. Model updating generally is much less frequent than live scoring. Over time, however, attributes become more or less predictive, while completely new attributes are made available through a new web form, a new data collection method, or a new data source. Technical advances in computing hardware (e.g. in memory or CPU cycles) or application software may now favor a particular algorithm. In addition, predictive models for "special purpose" uses can be needed. The model updating step, which iterates over the first two steps, keeps the model dynamic over time.

A more detailed discussion is provided toward block 100 of FIG. 1 regarding data selection, transformation, and augmentation.

Data processing for modeling email responses obtains a dataset that enables an example embodiment to apply statistical models and machine learning algorithms. Such a dataset contains known responses (whether or not a user responded to a past email campaign). Hence the dataset for training the models and algorithms are extracted from the historical data records.

In choosing representative campaigns, a selection is made of a subset of past email campaigns that are representative of (and similar to) planned future campaigns. This appropriate subset of past campaigns is selected based on a target audience (such as users who have uploaded photos or users who have not; users who have made at least one purchase or those who have not), time-of-year seasonality (such as Christmas shopping season, back-to-school, Valentine, Fourth-of-July, etc.), offer level (such as "20 Free Prints" or "15% Off"), and a combination of other factors.

Figure 2:
FIG. 2 shows a table of data for a selected subset of example past campaigns in accordance with an example embodiment of the present invention.

FIG. 2 shows a table 200 of data for a selected subset of example past campaigns. Each campaign has a date-time, and possibly a number of attributes associated with the campaign. The campaign date allows example embodiments to "go back in time" and derive behavioral attributes of the user just before each of the past campaigns. An increased likelihood of a user responding to an email exists when the user has recently performed an action related to the email campaign before the email campaign occurs. For example, it is discovered that users who have uploaded and shared photos before a campaign are much more likely to respond to a particular type of campaign relating to SNAPFISH™. The campaign-level attributes enable example embodiments to associate the user response with an attractiveness and timing of the campaign.

In one example embodiment, transaction data is transformed into rectangular data. For each historical campaign that is selected, attributes are derived that describe a user's state and behavior prior to the campaign. These attributes include recency or recentness (how many days prior to the campaign did the user upload a product associated with the campaign, e.g., photos, or make a purchase of a product or service associated with the campaign), frequency (how many times in the month, quarter, or year prior to the campaign did the user upload a product associated with the campaign, e.g., photos, or make a purchase of a product or service associated with the campaign), and monetary (how much money did the user spend in the month, quarter or year prior to the campaign, and in which product and service categories).

The "raw" data includes various tables in a database. These tables typically record transactions (actions and interactions) that the user initiated with regard to products and/or services associated with an email campaign. Examples of data tables are user uploads of photos, sharing of photos (inviting other users to view photos), viewing other users' photos (passive sharing), and purchasing of photo prints and gift items. In one example embodiment, the data records are in "log" format (as in a log book), and each entry is time-stamped.

Figure 3:
FIG. 3 shows an example table of transactional data for photo upload sessions in accordance with an example embodiment of the present invention.

FIG. 3 shows an example table 300 of the transactional data for photo upload sessions. The table includes transaction identifications (IDs), user IDs, and date and time.

Figure 4:
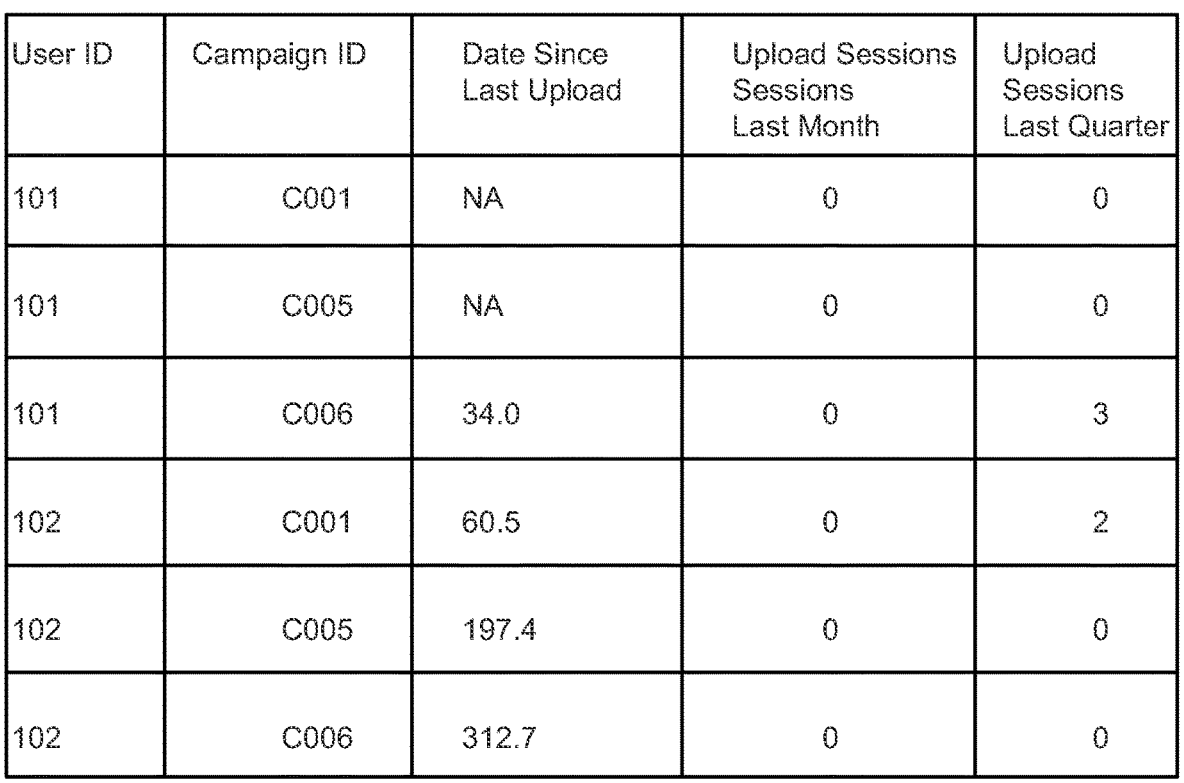
FIG. 4 shows a table that transforms linear logs of data into a rectangular format in accordance with an example embodiment of the present invention.

FIG. 4 shows a table 400 that transforms linear logs of data into a rectangular format. The data is derived based on a start date of the selected campaigns and the transaction date time stamp given in the two tables 200 and 300 of FIGS. 2 and 3.

The above recency and frequency attributes are dynamic in that their values for the same user change over time—depending on the start date of the campaigns. In other words, these attributes are derived based on the User_ID and Campaign_ID combinations (the Campaign_ID determines the point of time to look back at the user's transactions). Since there were tens of selected past campaigns, and millions of users (recipients) per campaign, the User_ID and Campaign_ID combinations can run into tens of millions of rows. Many of the dynamic attributes are extracted by joining different database tables, based on User ID, Campaign ID and other unique identifiers.

A more detailed discussion is provided with regard to data augmentation.

Figure 5:
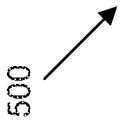
FIG. 5 shows a table of a rectangular dataset for an example campaign in accordance with an example embodiment of the present invention.

FIG. 5 shows a table 500 of a rectangular dataset for an example campaign. In the table, columns or attributes are appended that are associated with User_ID (such as the user's gender, derived from the user's first name) or with Campaign_ID (such as Campaign Offer). The last column, "Responded to Campaign", indicates whether or not (1 or 0) the user responded to each of the selected campaigns.

For table 500, a valid response depends on the objective of the campaign. By way of example, a valid or positive response could be a photo upload session if the email campaign's purpose is to convert the "image inactive" users (who have not uploaded any photos) to "image active" users; a response could be a log entry in the purchase transaction data table if the campaign aims at revenue generation. In this context, a response is determined as either an upload or a purchase on campaigns that are targeted to "image-inactive" users, and as a purchase on campaigns sent to "image-active" users. Additionally, a link is provided from the email to the log records of user transactions. In this example, the email message that the user received contained a hyperlink with a unique campaign code that identifies the campaign when the user clicked the hyperlink in the message body and jumped to the SNAPFISH™ website. A determination is made as to whether or not a user responded to the campaign by the campaign code in the hyperlink that led the user to the SNAPFISH™ website.

A more detailed discussion is now provided with regard to block 120 of FIG. 1 to show how predictive attributes are discovered, a best model is selected, and how this model is used to predict a probability of users responding to an email campaign.

With regard to modeling, the rectangular dataset shows the potential links between user attributes (dynamic+static) just before the campaign and user responses to the campaign (the outcome). The response modeling finds the precise linkages between the attributes (predictors X) and the response (Y).

For training and testing datasets, one example embodiment randomly selects 50% of the rows in the rectangular dataset as "training" data, and the rest of the rows as "testing" data. Various models and algorithms are trained on the training data, but they are evaluated and compared on the testing dataset. This way, "over-fitting" a model is avoided (an over-fit model would perform well on the dataset from which it is "learned", but poorly on a different dataset).

With regard to sampling and response rates, a typical email campaign gets about one response in 2,000 emails (a response rate of 0.05%). To learn a satisfactory model, thousands of positive responses are typically required and hence millions of rows in the training dataset are used. To accommodate for memory requirements and CPU time, one example embodiment uses choice-based sampling. The idea is to include all the positive responses (Y=1) in the training dataset, but only a fraction f of the non-responses (Y=0). A random sample, in contrast, would sample the same fraction from the positive responses and the negative responses. Choice-based sampling dramatically shrinks the training dataset by about 20-fold when f=0.05. To adjust for this "enriched" sample, one example embodiment uses case weights that are inversely proportional to f. This technique yields the same results with only a very slight increase in the standard errors of the coefficients in the learned model.

One example embodiment uses a logit (or logistic regression) model as a standard statistical method for modeling the probability of a binary response (Y=1 or 0). Each user i is described by a set of static attributes $X_s(i)$ (such as gender and source code); each campaign j is described by a set of attributes $X_c(j)$ (such as campaign offer type and message style type); each user has dynamic attributes $X_d(i, j)$ just before campaign j (such as recency of photo upload, i.e. the number of days between the last photo upload session and the campaign start date). Our pooled logit model postulates $$P\{Y(i, j) = 1\} = \frac{\exp[X_s(i)\beta_s + X_c(j)\beta_c + X_d(i, j)\beta_d]}{1 + \exp[X_s(i)\beta_s + X_c(j)\beta_c + X_d(i, j)\beta_d]}.$$

A numerical optimization procedure finds the coefficients vectors $(\beta_s, \beta_c, \beta_d)$ that maximize the following weighted likelihood function:

$$L = \prod_{i=1}^{N} [P\{Y(i, j) = 1\}]^{Y(i,j)} [1 - P\{Y(i, j) = 1\}]^{[1-Y(i,j)]/f},$$

where f is the choice-based sampling fraction.

One example embodiment uses decision tree model, aucCART, for scoring customers by their probability of response. A decision tree is a hierarchy of questions with "yes" or "no" answers, such as "Is $attribute_1 > 1.5$?" Each case starts from the root node and is "dropped down the tree" until it reaches a terminal (or leaf) node; the answer to the question at each node determines whether that case goes to the left or right sub-tree. Each terminal node is assigned a predicted class in a way that minimizes the misclassification cost (penalty). The task of a decision tree model is to fit a decision tree to the training data, i.e., to determine the set of suitable questions, or splits.

Like traditional tree models such as CART (Classification and Regression Trees), aucCART is a non-parametric, algorithmic model with built-in variable selection and cross-validation. However, traditional classification trees have some deficiencies for scoring. As one example of this deficiency, the models are designed to minimize the misclassification risk, and typically do not perform well in scoring. This is because there is a global misclassification cost function, which makes it undesirable to split a node whose class distribution is relatively far away from that of the whole population, even though there may be sufficient information to distinguish between the high- and low-scoring cases in that node. For example, assume that the two classes, say Y=0 and Y=1, occur in equal proportions in the training data and the costs of misclassifying 0 as 1 and 1 as 0 are equal. Suppose that, while fitting the tree, one finds a node with 80% 1s (and 20% 0s) which can be split into two equally-sized children nodes, one with 90% 1s and the other with 70% 1s. All these nodes have a majority of 1s and will be assigned a predicted class of 1; any reasonable decision tree will not proceed with this split since it does not improve the misclassification rate. However, when scoring is the objective, this split is potentially attractive since it separates the cases at that node into a high-scoring group (90% 1s) and a lower-scoring group (70% 1s). As another example of this deficiency, the model needs to specify a global misclassification cost. This is not a meaningful input when the objective is to score cases.

The aucCART method is based on CART and is designed to avoid these deficiencies. The model combines a new tree-growing method that uses a local loss function to grow deeper trees and a new tree-pruning method that uses the penalized AUC risk $R_\alpha(T)=R(T)+\alpha|T|$. Here, the AUC risk $R(T)$ is the probability that a randomly selected response scores lower than a randomly selected non-response, $|T|$ is the size of the tree, and $\alpha$ is the regularization parameter, which is selected by cross-validation. This method is (even) more computationally intensive than CART, in part because it runs CART repeatedly on subsets of the data and in part because minimizing the penalized AUC risk requires an exhaustive search over a very large set of subtrees. In practice, an example embodiment avoids the exhaustive search by limiting the search depth.

Regarding variable transformations, the attributes (columns) in the training dataset, $X_s(i)$, $X_c(j)$, and $X_d(i, j)$, are classified as either numerical (such as the number of days between the last photo upload session and the campaign start date) or categorical (such as campaign format and offer type). It may not be apparent how to treat an attribute as numerical or categorical; an example is gender, which typically has 3 possible values: Male, Female, or Unknown. However, in one example embodiment, the gender of a user is represented by the probability of the user being female—which is a numerical, continuous, value between 0 and 1 (such as 0.95). Another example is integer-valued attributes (such as the number of times (sessions) a user has uploaded photos, which can be 0, 1, 2, etc); these integer values can be treated as either numerical or categorical.

Classification tree learners automatically decide on the treatment of attribute values. These algorithms convert numerical values into categorical "segments" (such as probability of being female between 0 and 0.7 as a single segment) and "groups" (such as grouping campaign formats of "Valentine" and "Fourth of July" as a single group, and grouping "Thanksgiving" and "Christmas" as another single group). In the logit model, the modeler decides on the most appropriate variable transformation for each attribute.

One example embodiment performs the following transformations:
1. From numerical to numerical:
   a. The log transformation is a frequently used non-linear transformation: Examples are log(1+Recency); log(1+Frequency Count).
   b. The truncation (from above, from below, or both), useful for treating attributes that have very small or very large data values. Examples are:
   max(Recency, 5)—any Recency values less than 5 days are "rounded up" to 5 days;
   min(Frequency Count, 20)—any Frequency Count greater than 20 are "rounded down" to 20;
   min(max(Recency, 5), 1080)—any Recency value that is less than 5 or greater than 1080 is rounded to 5 or 1080.
2. From numerical to categorical:
   a. Bracketing, useful for breaking a continuous valued attribute into several segments. An example is "Purchases in past year in dollars"; we could break it into the following segments: $0 (no purchases yet); (0, 20]; (20, 100]; (100, 1000]; >$1000. Another example is gender: If probability of female is greater than 0.5, then we classify the user as "Female", otherwise as "Male".
3. From categorical to categorical:
   a. Grouping (or merging), useful for reducing the number of categorical values for an attribute. An example is the Campaign Format attribute; we could group "Valentine" and "Fourth of July" as a single format value.

In case there is no clear indication which type of transformation for an attribute is best, one example embodiment tries all reasonable transformations and selects the one that yields the best model. In many cases, a best transformation is determined by investigating the residual plots for the logit model. Furthermore, the output produced from the classification-tree based aucCART algorithm (which automatically transforms some attributes) suggests the most appropriate transformation of an attribute for the logit model.

One example embodiment extracts approximately 80 attributes (or variables) from transaction data tables. These attributes include recency, frequency and monetary (RFM); frequency-related attributes can further include transaction counts in different time intervals (such as past month, past quarter, past year, or cumulative); monetary attributes can include different time intervals and different product categories (such as dollars of purchases in the "photo prints" category in the past year).

Although one may expect each attribute adds to the predictability of the response, in an example embodiment only a subset of these attributes are statistically significant in the logit model, as many variables can be highly correlated (so once a variable is used in the model, many other variables would add a statistically insignificant amount of additional predictive power).

For the logit model, one example embodiment performs variable selection by using both forward and backward step-wise selection. In forward selection, start with a single predictor variable (attribute), and add variables (with appropriate variable transformations) one by one, until no statistically significant variable can be added, or AIC (Akaike Information Criterion) value can be improved. In backward selection, start with all attributes (properly transformed) included in the model, and delete statistically insignificant variables one at a time, until all remaining variables are statistically significant.

For the classification-tree based aucCART algorithm, variable selection is automatically performed (a "built-in" feature of classification-tree based algorithms).

Models in accordance with example embodiments indicate that the strongest predictors of customer response are: the recency of a user's photo upload sessions, the dollar amount of the user's past 15-month purchases, and the user's recorded responses to prior email campaigns, while user gender, email format and offer type are also significant.

In order to evaluate competing models, various heuristics or scoring rules have been commonly used by marketing professionals to predict responses and selecting target recipients. One such heuristic for selecting recipients is "upload recency", which ranks recipients by the most recent to least recent in their last photo upload sessions. The upload "recency heuristic" postulates that the more recent a user's upload session is, the higher the probability of responding to an email the heuristic predicts.

To evaluate various rules, models and algorithms, a metric is used that is applicable to a wide variety of models, and that is also relevant to how the models will be used. One example embodiment uses a "capture curve" for each model or scoring rule. The capture curve measures the percentage (Y-axis) of positive responses captured (in a holdout dataset) if the model is used to select a given percentage (X-axis) of customers. The capture curves indicate that the logit model is more effective in predicting and capturing customer responses to emails than a simple RFM method (upload recency for image-active users or activity recency for image-inactive users). For example, the logit model for image-active users is able to capture 92.1% of the campaign responses by selecting only the top 50% of the users.

Example embodiments in accordance with the invention are applicable not only in email campaign response modeling, but also to any customer interaction context (on-line, off-line or mixed media, such as coupons or direct marketing mails) where "response" is generally defined and tracked (measured), and where predictive attributes include customer static attributes (such as gender), stimulus attributes (such as email format), and customer-stimulus dynamic attributes (such as the number of days between customer's last action and the stimulus). Furthermore, example embodiments are applicable to models beyond logit and classification trees and to customer states beyond "image-active" and "image-inactive".

An example embodiment uses modeling approaches (such as logit and aucCART) to improve the accuracy of predicting the likelihood of user responses. This allows campaign planners and marketers to be more targeted in their recipient selection, leads to a reduced sent-list size, lowers cost, and increases response rate.

One example embodiment streamlines the whole process of data preparation, modeling, live scoring and model updating, and automates some of the sub-tasks in the process. Streamlining and automation of such processes achieves a speed advantage of being able to deliver results for email campaign planners and enables campaigners to plan and execute email campaigns more frequently.

Figure 6:
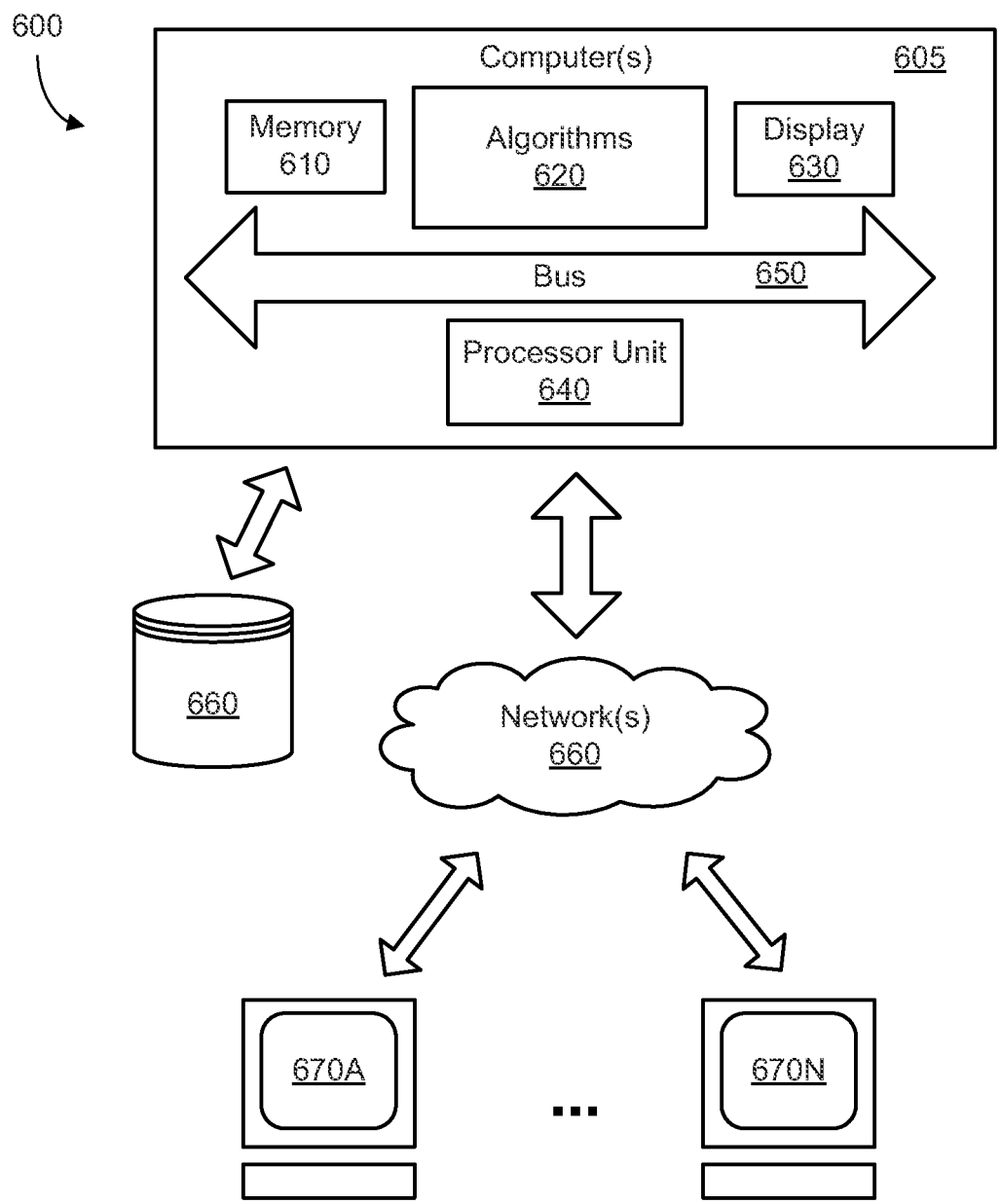
FIG. 6 shows a computer system for implementing processes in accordance with an example embodiment of the present invention.

FIG. 6 is a block diagram of a computer system 600 in accordance with an example embodiment of the present invention. The computer system executes methods described herein, including the blocks illustrated in FIG. 1.

The computer system includes one or more databases or warehouses 660 coupled to one or more computers or servers 605 which, in turn, connect through one or more networks 660 (such as the Internet) to a plurality of user computers 670A-670N (such as millions of electronic devices and/or computers of users that receive emails in an email campaign).

By way of example, the computer 605 includes memory 610, algorithms 620, display 630, processing unit 640, and one or more buses 650. The processor unit includes a processor (such as a central processing unit, CPU, microprocessor, application-specific integrated circuit (ASIC), etc.) for controlling the overall operation of memory 610 (such as random access memory (RAM) for temporary data storage, read only memory (ROM) for permanent data storage, and firmware). The processing unit 640 communicates with memory 610 and algorithms 620 via one or more buses 650 and performs operations and tasks necessary for predicting email responses as explained herein. The memory 610, for example, stores applications, data, programs, algorithms (including software to implement or assist in implementing embodiments in accordance with the present invention) and other data.

Definitions

As used herein and in the claims, the following words are defined as follows:

The term "email campaign" means marketing of products and/or services by sending emails or electronic mail messages over the Internet.

The term "SNAPFISH™" is web-based service that provides print services and enables users to share photos with other users. SNAPFISH™ is located on the internet at www.snapfish.com, has millions of members, and stores over a billion digital pictures for members.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit the invention.

In the various embodiments in accordance with the present invention, embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer system in executing an on-line marketing campaign, the method comprising:
    obtaining historical data that includes email-related attributes, the email-related attributes consisting of attributes describing content of emails sent in a first email campaign to users and attributes describing behavior of the users in response to the first email campaign, the email-related attributes comprising a first attribute describing whether particular users clicked on a link embedded in emails sent in the first email campaign;
    filtering, by the computer system, the email-related attributes with a logistic regression model to generate first predictive attributes;
    filtering, by the computer system, the email-related attributes with a decision tree model to generate second predictive attributes;
    comparing, by the computer system, the first and the second predictive attributes from the logistic regression model and the decision tree model, respectively, wherein the first predictive attributes are different from the second predictive attributes;
    identifying, by the computer system based on the comparing, a set of predictive attributes comprising predictive attributes from the first predictive attributes and the second predictive attributes that are most accurate in determining which of the users will respond to a second email campaign, the identified set of predictive attributes including at least one attribute from the first predictive attributes and at least one attribute from the second predictive attributes;
    selecting, by the computer system, a best model of the logistic regression model and the decision tree model based on accuracy of the logistic regression model and the decision tree model;
    applying, by the computer system, the identified set of predictive attributes to the best model to predict a probability of the users responding to the second email campaign; and
    sending, by the computer system, emails during the second email campaign to a set of the users based upon the predicted probability of the users responding to the second email campaign.

2. The method of claim 1, wherein the decision tree model includes a CART (Classification and Regression Tree) based model that uses a penalized risk $R(T)=R(T)+\alpha|T|$, where risk $R(T)$ is a probability that a randomly selected response scores lower than a randomly selected non-response, wherein $|T|$ is a size of a tree, and $\alpha$ is a regularization parameter selected by cross-validation.

3. The method of claim 1, wherein the content of the emails sent to the users includes discounts on products advertised in the first email campaign.

4. The method of claim 1, further comprising:
    extracting, by the computer system, data relating to a frequency of the users visiting a website; and
    determining, by the computer system, the accuracy of the logistic regression model and the decision tree model using the extracted data.

5. The method of claim 1 further comprising, predicting a probability of a user being a male or female based on a given name of the user.

6. The method of claim 1 further comprising, generating, from the historical data, a table that includes a plurality of rows with individual rows representing a different user who received an email in a previous email campaign and a plurality of columns with individual columns that include an attribute that describes the users identified in the plurality of rows and the content of the email and an attribute that describes a recency of user activity prior to the previous email campaign.

7. The method of claim 1, wherein the email-related attributes include an amount of money the users who received the emails spent on products of an advertiser in the first email campaign.

8. The method of claim 1, wherein the email-related attributes include whether the users responded to the first email campaign.

9. A non-transitory computer readable storage medium having instructions that when executed by a processor, cause the processor to:
    obtain historical data that includes email-related attributes, the email-related attributes consisting of attributes describing content of emails sent in a first email campaign to users and attributes describing behavior of the users in response to the first email campaign, the email-related attributes comprising a first attribute describing whether particular users clicked on a link embedded in emails sent in the first email campaign;
    filter the email-related attributes with a logistic regression model to generate first predictive attributes;
    filter the email-related attributes with a decision tree model to generate second predictive attributes;
    compare, the first and the second predictive attributes from the logistic regression model and the decision tree model, respectively, wherein the first predictive attributes are different from the second predictive attributes;
    identify, based on the comparison, a set of predictive attributes comprising predictive attributes from the first predictive attributes and the second predictive attributes that are most accurate in determining which of the users will respond to a second email campaign, the identified set of predictive attributes including at least one attribute from the first predictive attributes and at least one attribute from the second predictive attributes;
    select a best model of the logistic regression model and the decision tree model based on accuracy of the logistic regression model and the decision tree model;
    apply the identified set of predictive attributes to the best model to predict a probability of the users responding to the second email campaign; and
    send emails during the second email campaign to a set of the users based upon the predicted probability of the users responding to the second email campaign.

10. The non-transitory computer readable storage medium of claim 9, wherein the instructions are to further cause the processor to use the logistic regression model to model a probability of a user responding to the second email campaign in response to the logistic regression model being identified as the best model.

11. The non-transitory computer readable storage medium of claim 9, wherein the instructions are to further cause the processor to apply to the decision tree model a decision tree that includes a hierarchy of yes answers and no answers to determine a probability of a user responding to the second email campaign in response to the decision tree model being identified as the best model.

12. The non-transitory computer readable storage medium of claim 9, wherein the instructions are to cause the processor to:
predict responses of a user to the second email campaign based on recency of the user uploading information to a website and an amount of money the user previously spent on purchases.

13. The non-transitory computer readable storage medium of claim 9, wherein the email-related attributes include whether the users uploaded photos to a website, whether the users shared photos through the website, whether the users viewed photos on the website, and a recency of user activity prior to a previous email campaign.

14. The non-transitory computer readable storage medium of claim 9, wherein the instructions are to further cause the processor to:
derive, from a first name of a user, a gender of the user; and
use the gender of the user to predict a likelihood that the user will respond to the second email campaign.

15. A computer system, comprising:
a database that stores historical data gathered from emails sent to users in a first email campaign, the historical data including email-related attributes, the email-related attributes consisting of attributes describing content of the emails sent to the users and attributes describing behavior of the users in response to the first email campaign, the email-related attributes comprising a first attribute describing whether particular users clicked on a link embedded in emails sent in the first email campaign; and
a memory on which is stored instructions that are to cause a processor to:
filter the email-related attributes with a logistic regression model to generate first predictive attributes;
filter the email-related attributes with a decision tree model to generate second predictive attributes;
compare, the first and the second predictive attributes from the logistic regression model and the decision tree model, respectively, wherein the first predictive attributes are different from the second predictive attributes;
identify, based on the comparison, a set of predictive attributes comprising predictive attributes from the first predictive attributes and the second predictive attributes that are most accurate in determining which of the users will respond to a second email campaign, the identified set of predictive attributes including at least one attribute from the first predictive attributes and at least one attribute from the second predictive attributes;
select a best model of the logistic regression model and the decision tree model based on accuracy of the logistic regression model and the decision tree model;
apply the identified set of predictive attributes to the best model to predict a probability of users responding to the second email campaign; and
send emails during the second email campaign to a set of the users based upon the predicted probability of the users responding to the second email campaign.

16. The computer system of claim 15, wherein the identified set of predictive attributes include a personal characteristic of the users receiving an email in the first email campaign and a description of a promotion on a product offered in the email.

17. The computer system of claim 15, wherein the instructions are further to cause the processor to augment the historical data with additional data that includes a subject line of the emails sent in the first email campaign and a percentage of discounts offered in the emails of the first email campaign.

18. The computer system of claim 15, wherein the email-related attributes include whether recipients of the emails in the first email campaign upload a photo to a web site associated with the first email campaign, whether recipients of the emails in the first email campaign purchase a product advertised in the first email campaign, whether recipients of the emails in the first email campaign click a hyperlink in the first email campaign, and a recency of user activity prior to a previous email campaign.

19. The computer system of claim 15, wherein the instructions are further to cause the processor to:
associate an increased likelihood of a user to respond to the second email campaign in response to the user uploading information to a website advertised in the first email campaign.

20. The computer system of claim 15, wherein the identified set of predictive attributes include gender of the users, how many days since the users last visited a website associated with the first email campaign, and how much money the users spent on products advertised in the first email campaign.

* * * * *